(12) United States Patent
Gesset

(10) Patent No.: US 9,924,118 B2
(45) Date of Patent: Mar. 20, 2018

(54) SILICON-BASED IMAGE SENSOR WITH IMPROVED READING DYNAMIC RANGE

(71) Applicant: E2V SEMICONDUCTORS, Saint Egreve (FR)

(72) Inventor: Stéphane Gesset, Saint-Laurent-du-Pont (FR)

(73) Assignee: E2V SEMICONDUCTORS, Saint Egreve (FR)

( * ) Notice: Subject to any disclaimer, the term of this patent is extended or adjusted under 35 U.S.C. 154(b) by 0 days.

(21) Appl. No.: 15/033,964

(22) PCT Filed: Oct. 30, 2014

(86) PCT No.: PCT/EP2014/073354
§ 371 (c)(1),
(2) Date: May 3, 2016

(87) PCT Pub. No.: WO2015/063220
PCT Pub. Date: May 7, 2015

(65) Prior Publication Data
US 2016/0277689 A1    Sep. 22, 2016

(30) Foreign Application Priority Data

Nov. 4, 2013    (FR) ..................... 13 60769

(51) Int. Cl.
*H04N 5/355* (2011.01)
*H04N 5/243* (2006.01)
(Continued)

(52) U.S. Cl.
CPC .......... *H04N 5/3559* (2013.01); *H04N 5/243* (2013.01); *H04N 5/355* (2013.01); *H04N 5/378* (2013.01); *H04N 5/3745* (2013.01)

(58) Field of Classification Search
CPC ...... H04N 5/3559; H04N 5/243; H04N 5/355; H04N 5/3745; H04N 5/378
See application file for complete search history.

(56) References Cited

U.S. PATENT DOCUMENTS 5,192,920 A * 3/1993 Nelson .................. H03F 1/0233
                                              330/156
5,905,256 A * 5/1999 Nakano ............. H01L 29/76816
                                              250/214 A
(Continued)

FOREIGN PATENT DOCUMENTS

WO       01/61756 A2     8/2001
WO    2008028030 A2      3/2008

OTHER PUBLICATIONS

International Search Report and Written Opinion for PCT/EP2014/073354, dated Jan. 28, 2015.
(Continued)

*Primary Examiner* — Nicholas Giles
(74) *Attorney, Agent, or Firm* — Hauptman Ham, LLP; Sean A. Passino

(57) ABSTRACT

In an image sensor, the effective capacitance of the storage node NS of the pixel, which stores the charges (the electrons) collected by the photosensitive element of the pixel, is modified with the aid of a feedback loop 100 which influences the supply $V_{REFP}$ of the follower transistor T3 connected to the storage node, in such a way that the apparent capacitance of the storage node depends on the gain $G_L$ of the loop. By modifying the gain, the capacitance of the storage node and therefore the charge/voltage conversion factor, which is inversely proportional to this capacitance, is modified.

10 Claims, 7 Drawing Sheets

(51) Int. Cl.
*H04N 5/3745* (2011.01)
*H04N 5/378* (2011.01)

(56) References Cited

U.S. PATENT DOCUMENTS

| | | | |
|---|---|---|---|
| 6,831,486 B1 | 12/2004 | Hynecek | |
| 7,088,393 B1* | 8/2006 | Park | G11C 19/285 |
| | | | 330/110 |
| 7,911,512 B2* | 3/2011 | Henderson | H04N 5/363 |
| | | | 348/234 |
| 2003/0193595 A1* | 10/2003 | Henderson | H04N 5/363 |
| | | | 348/308 |
| 2006/0157640 A1 | 7/2006 | Perlman et al. | |

OTHER PUBLICATIONS

EPO Communication in EP Application No. 20140793835, dated Oct. 25, 2017.

* cited by examiner

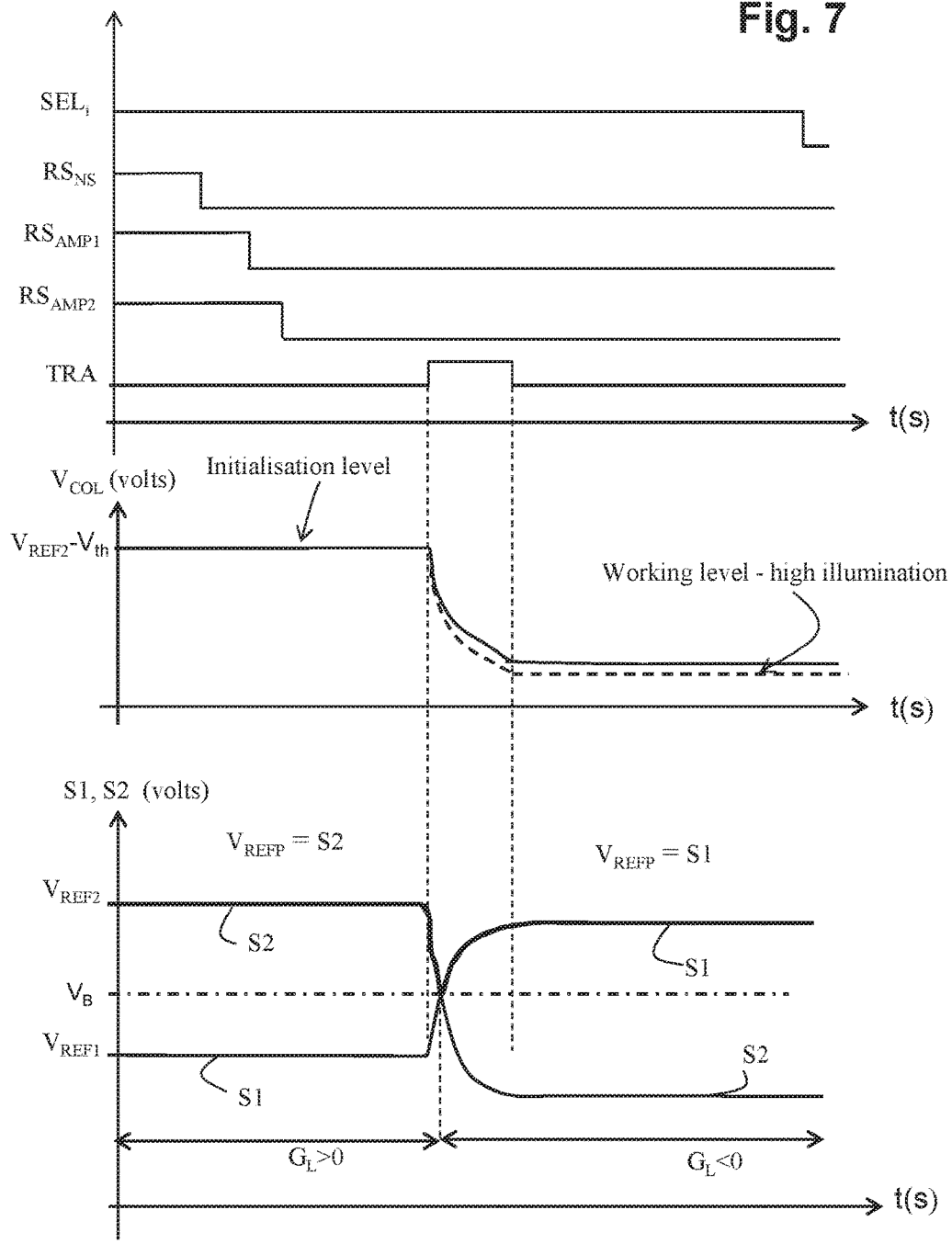

SILICON-BASED IMAGE SENSOR WITH IMPROVED READING DYNAMIC RANGE

TECHNICAL FIELD

The field of the invention is that of silicon-based image sensors, both matrix sensors and linear sensors, the dynamic range of which is intended to be improved.

STATE OF THE ART

The dynamic range of a sensor is expressed in decibels (dB), and is defined by the ratio of the strongest signal, corresponding to high illumination, to the background noise level of the sensor, which determines the weakest signal, corresponding to low illumination, observable at the output. This background noise level depends on the technology of the sensor and the characteristics of the electronic system for reading the pixels. The term sensor with a large scene dynamic range generally refers to sensors whose dynamic range is more than 80 dB.

The dynamic range of the sensor depends on characteristics inherent to the pixel and to its structure, in particular its capacity to convert photons into electrons, i.e. the quantum efficiency, and its capacity to convert the collected electrons into voltage, i.e. the charge/voltage conversion gain, and characteristics inherent to the reading circuit downstream of the pixel: gain of the reading circuit and excursion of the voltage acceptable by the analog/digital converter of the reading circuit. This dynamic range is also constrained by technological factors: in the photosensitive region in which the pixels are formed, this relates notably to the fill factor of the pixel, that is to say the ratio of the photosensitive region of the pixel to the total surface area of the pixel; in the peripheral region around the photosensitive region, this relates to the surface area of silicon available for the reading circuits. The conversion rate and the power consumption should also be taken into account.

When seeking to produce sensors offering a large scene dynamic range, of 80, 84, 90 dB or more, it is necessary to have a pixel structure making it possible to store a large quantity of charge during the integration period of the sensor, without which there is a risk of saturating the measurement system at the level of the highly illuminated pixel. Then, however, it is necessary for the gain of the conversion of charges into voltage to be relatively low, without which the reading and analog/digital conversion circuits will be saturated It is an object of the invention to provide a solution for adjusting the charge/voltage conversion gain of the pixel so as to obtain a gain which can be adapted to the received illumination in order to avoid saturation in the event of high illumination and to maintain a sufficiently high charge/voltage conversion gain in the event of low illumination.

A basic structure of a pixel of a sensor with active silicon-based pixels comprises:
  a capacitive storage node which stores the charges (the electrons) collected by the photosensitive element the pixel, which may be formed by the intrinsic capacitance of the photosensitive element, or, in an active pixel structure with an intermediate storage node (pixel with four or more transistors), by a separate capacitor connected to the photosensitive element by a charge transfer transistor; and
  a follower transistor connected to this storage node, which provides at its output a voltage level representative of the quantity of charge on the storage node.

The technical solution on which the invention is based consists principally in modifying the effective capacitance of the storage node of the pixel, by using a feedback loop which influences the supply of the follower transistor connected to the storage node, in such a way that the apparent capacitance of the storage node depends on the gain of the loop. By modifying the gain, the capacitance of the storage node and therefore the charge/voltage conversion factor, which is inversely proportional to this capacitance, are modified.

This modification of the effective capacitance of the storage node results principally from the fact that the effective capacitance is the sum of the intrinsic capacitance of the storage node, the gate/source and gate/drain capacitances of the follower transistor connected to the storage node, these latter two capacitances each being brought by the Miller effect in parallel with the storage node with a respective weighting coefficient, which, for the gate/drain capacitance, depends on the gain of the follower transistor and on the gain of the feedback loop.

Consequently, the invention provides an image sensor comprising pixels and reading circuits, each pixel having at least one photosensitive element, a node for storage of charges generated by the photosensitive element, and a follower transistor, the gate of which is connected to the storage node, the source of which is connected to a column conductor, itself connected to a reading circuit, and the drain of which receives a supply voltage, characterized in that a feedback loop is provided, this loop having an input connected to the column conductor and an output connected to the drain of the follower transistor in order to provide the supply voltage of the latter, and in that means are provided for modifying the behaviour of the feedback loop as a function of the illumination received.

The behaviour of the feedback loop may be modified by enabling or disabling the loop as a function of the illumination received. Alternatively, it may be modified by modifying the gain of the loop as a function of the illumination received.

In both cases, the received illumination may be the overall illumination received by the sensor, or it may be the illumination received by the pixel itself.

If the illumination is the overall illumination of the sensor, it is possible to provide automatic detection of the overall illumination and action on the behaviour of the loop as a function of this detection, or it is possible to provide manual action by the user, who decides whether he wishes to enter high illumination mode or low illumination mode, and who consequently modifies the gain or enables or disables the loop.

If, on the other hand, the illumination is the illumination received by the pixel itself, independently of the other pixels, the behaviour of the loop will preferably be modified as a function of the voltage present on the column conductor at the time when the charges of the storage node are read, because this voltage represents the illumination received by the pixel: for example, a different loop gain will be adopted according to the voltage level present on the column.

In particular, the loop gain may be positive or negative. If it is negative, it increases the effective capacitance of the storage node and consequently reduces the charge/voltage conversion factor. If it is positive, it decreases the effective capacitance of the storage node and significantly increases the charge/voltage conversion factor. Provision may therefore preferably be made for the loop gain to be made positive or negative as a function of the illumination received.

The feedback loop is preferably disabled during a phase of reinitialising the storage node, before transfer of charges from the photosensitive element to the storage node.

Preferably, the feedback loop comprises a first amplifier with a negative gain, the input of which is connected to the column conductor, a second amplifier with a negative gain, the input of which is connected to the output of the first amplifier, a comparator having two inputs respectively connected to the outputs of the two amplifiers, and a routing means controlled by the comparator for directing either the output of the first amplifier or the output of the second amplifier to the drain of the follower transistor.

Preferably, the first amplifier comprises a first input connected to a first reference voltage, a second input connected to an input capacitor, a feedback capacitor, and a switch for short-circuiting the feedback capacitor during a phase of initialising the storage node; and the second amplifier comprises a first input connected to a second reference voltage, a second input connected to an input capacitor, a feedback capacitor and a switch for short-circuiting the feedback capacitor during a phase of initialising the storage node.

The proposed solution does not affect the fill factor of the pixel, which is an additional advantage.

BRIEF DESCRIPTION OF THE DRAWINGS

Other characteristics and advantages of the invention are given in the following detailed description, provided by way of indication and without implying limitation, and with reference to the appended drawings, in which:

FIGS. 6 and 7 are time diagrams of the various signals in the sequence of reading a pixel with such a feedback loop having two amplifiers, in the case of a column voltage, the first (FIG. 6) corresponding to a low illumination level of the pixel and the second (FIG. 7) corresponding to a high illumination level of the pixel.

DETAILED DESCRIPTION

The invention will be described in an example of application to an active pixel structure of a CMOS sensor with four transistors. The field of application of the invention does, however, apply more widely to various structures of a pixel with a charge storage node coupled to a follower transistor: to pixels having a more complex structure, using more transistors; or to pixels having a structure with three transistors, in which it is the capacitance of the photosensitive element which directly constitutes the capacitive storage node.

Figure 1A:
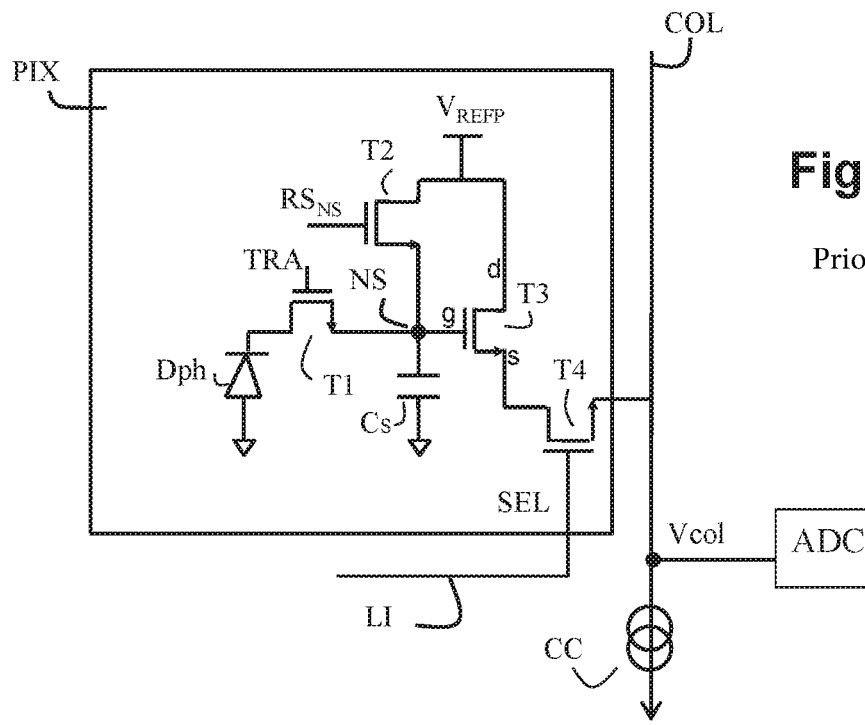
FIGS. 1a and 1b respectively, illustrate a basic structure of a CMOS sensor pixel with four transistors, and the associated sequencing signals for reading such a pixel, according to the prior art.
Figure 1B:
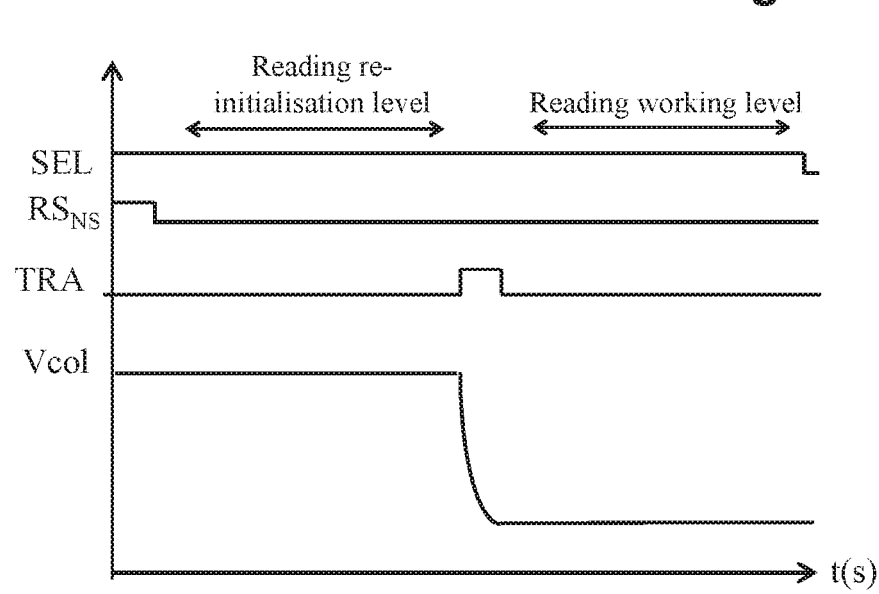

FIGS. 1a and 1b illustrate the structure and the sequencing of the reading signals of a pixel PIX with four transistors of a CMOS sensor matrix. The matrix is organised in rows and columns of pixels with an identical structure.

Each pixel PIX is connected to a column conductor connecting all the pixels of a given column of pixels. Each column conductor is connected to a current source CC, which is generally common to all the columns of the matrix and which provides the current necessary for reading a pixel, selected for reading, of the column, and to a circuit ADC for reading the pixels of the column, which converts the voltage level Vcol applied to the column conductor by the pixel PIX selected for reading into digital form. This voltage level Vcol is representative of the illumination received by the pixel.

In the example, the photosensitive element of the pixel is a photodiode Dph. Other photosensitive elements may be used, for example a MOS capacitor.

This photodiode is connected to a capacitive storage node NS by a transistor T1, during a phase TRA of transferring the charges collected by the photodiode to the capacitance Cs of the storage node NS.

A follower transistor T3 provides on its source s, supplied with a constant current provided by a current source CC, an output voltage which is representative of the quantity of charge transferred onto the capacitive storage node. Its gate g is connected to the storage node NS, and its drain d receives a supply voltage $V_{REFP}$ sufficient to bias the transistor T3 in follower mode (biasing in saturation mode), when the pixel is selected for reading, making it possible to copy the voltage of the storage node onto the column conductor.

A selection transistor T4 is connected between the source s of the follower transistor T3 and a column conductor COL, which connects the pixels of a given column. Its gate is connected to a conductor line LI by which a selection signal (SEL) for the pixel is applied. When the pixel is selected for reading, the transistor T3 operates as a follower and the voltage Vcol on the column conductor is established at the output voltage of the pixel.

A reinitialisation transistor T2 is provided for reinitialising the storage node NS. In the example, it is connected between the supply voltage $V_{REFP}$ and the storage node NS, bringing this node to the voltage $V_{REFP}$.

When the pixel is selected for reading (signal SEL active), the phase of initialising the storage node NS, during which the voltage at the node is established and stabilises at the reinitialisation level $V_{REFP}$, is carried out by the signal $RS_{NS}$, and a phase of transferring the charges collected by the photosensitive element Dph to the storage node NS, during which the voltage at the storage node will be established at a working level representative of the quantity of charge stored by the node NS, as a function of the charge/voltage conversion factor of the pixel, is carried out by the signal TRA. During this time, the voltage Vcol on the column COL, which is a copy of the voltage at the storage node, to within the threshold voltage of the follower transistor, is therefore established at a corresponding reinitialisation level, then a corresponding working level.

The reading of the pixel by the reading circuit ADC generally consists of a first analog/digital conversion of the voltage Vcol, carried out between the initialisation phase ($RS_{NS}$) and the transfer phase (TRA), in order to obtain a first digital value representative of the reinitialisation level, and a second conversion of the voltage Vcol, carried out after the transfer phase, in order to obtain a second digital value representative of the working level, then subtraction between the two digital values obtained. A digital result is obtained, which is a measurement representative of the illumination received by the pixel and freed of the correlated noise associated with the capacitive storage node.

The pixel structure and the corresponding reading sequence having been discussed, we will now explain how, by the invention, the charge/voltage conversion factor at the capacitive storage node of the pixel can be affected in order to improve the usable dynamic range of the pixel.

The charge/voltage conversion factor of the pixel, which is expressed in volts per electron, defines, for the pixel, the voltage level which will be obtained at the input of the reading circuit ADC for an electron collected by the photosensitive element of the pixel.

Figure 2:
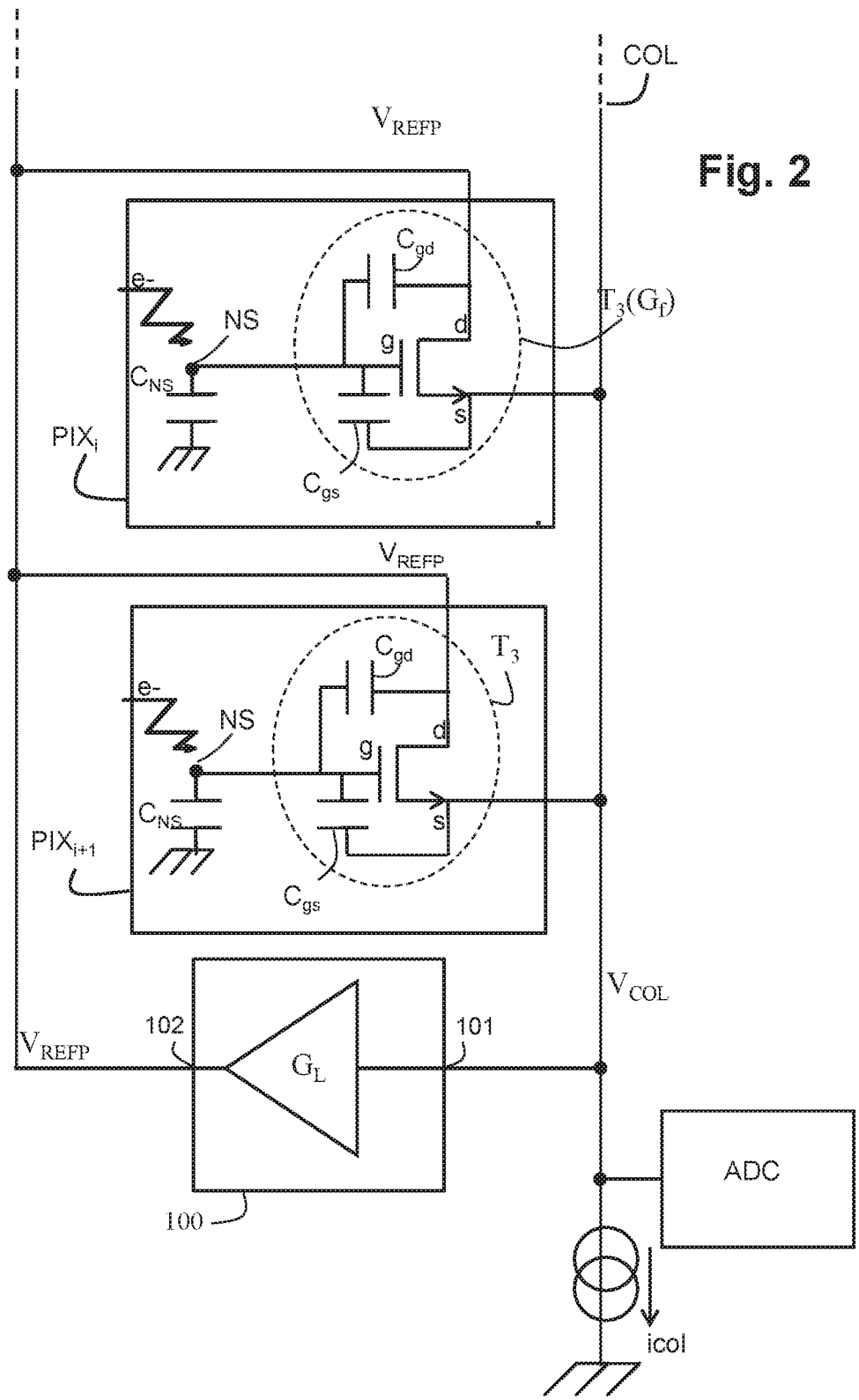
FIG. 2 illustrates a feedback loop between the conductor of a pixel column and the drain of the follower transistor of these pixels, according to the invention.

FIG. 2 details the elements or parameters of the pixel which are involved in the definition of the conversion factor: the capacitance $C_{NS}$ of the storage node NS of the pixel and the gain and intrinsic capacitances of the follower transistor. The gain of the follower transistor, denoted as $G_f$, is close to 1, generally of the order of 0.8 or 0.9. The intrinsic capacitances of the follower transistor are the capacitance $C_{gs}$ between the gate and source of the transistor T3, and the capacitance $C_{gd}$ between the gate and drain of the follower transistor T3. This follower transistor has an intrinsic gain.

The total capacitance seen by the storage node NS therefore comprises the contribution of the capacitances $C_{NS}$ and $C_{gd}$, and that of the capacitance $C_{gs}$, but the latter in a proportion reduced by the Miller effect to $(1-G_f)C_{gs}$.

The charge/voltage conversion factor is then written as follows for this pixel structure:

$$CVF = \frac{q}{C_{NS} + (1 - G_f) \times C_{gs} + C_{gd}} \times G_f$$

where q is the charge of an electron.

This definition applies for a pixel structure with a capacitive storage node connected to a follower transistor biased with a fixed reference voltage $V_{REFP}$, provided by an electrical supply to all the pixels of the sensor, according to the prior art (FIG. 1a).

In the invention, and as illustrated in FIG. 2, the voltage $V_{REFP}$ is provided during the reading of the pixel by a feedback loop 100, having a loop gain $G_L$, inserted between the column conductor and the drain of the follower transistor of the pixels of the column.

More precisely, the feedback loop 100 has its input 101 connected to the column conductor COL. Its output 102 is connected to a supply conductor, which supplies the drain of the follower transistor T3 of each of the pixels of the column COL.

In practice, there will thus be one feedback loop per column.

The drain voltage applied during the reading of a pixel of the column then depends on the voltage Vcol provided by the column conductor during the reading of this pixel. In this way, seen from the storage node NS, the contribution of the gate/drain capacitance $C_{gd}$ of the transistor to the conversion factor CVF also becomes proportional to a Miller effect added by the feedback loop according to the invention. This proportion depends on the gain of the follower transistor and the gain of the loop.

More precisely, the charge/voltage conversion factor is then written as follows, for this pixel structure having a feedback loop with a gain $G_L$:

$$CVF = \frac{q}{C_{NS} + (1 - G_f) \times C_{gs} + (1 - G_L, G_f) \times C_{gd}} \times G_f$$

The feedback loop 100 therefore makes it possible to use the gate/drain capacitance of the follower transistor in order to modify the value of the charge/voltage conversion factor. With a negative loop gain $G_L$, the contribution of this gate/drain capacitance to the effective capacitance of the storage node is increased. The charge/voltage conversion factor CVF is consequently reduced. The dynamic range of the sensor towards high illumination levels is improved. Conversely, with a positive loop gain, the contribution of this gate/drain capacitance becomes more "negative", which makes it possible to increase the factor CVF, which is favourable at low illumination levels.

The feedback loop 100 therefore makes it possible to improve the usable dynamic range of a pixel, for a given pixel structure and reading electronics system. It may be implemented in practice in order to improve the dynamic range for high illumination levels and/or low illumination levels.

Various practical exemplary embodiments allowing the invention and its applications to be understood better will now be described with reference to FIGS. 3 and 4. In order to facilitate understanding, the elements common to the various figures have the same references.

Figure 3:
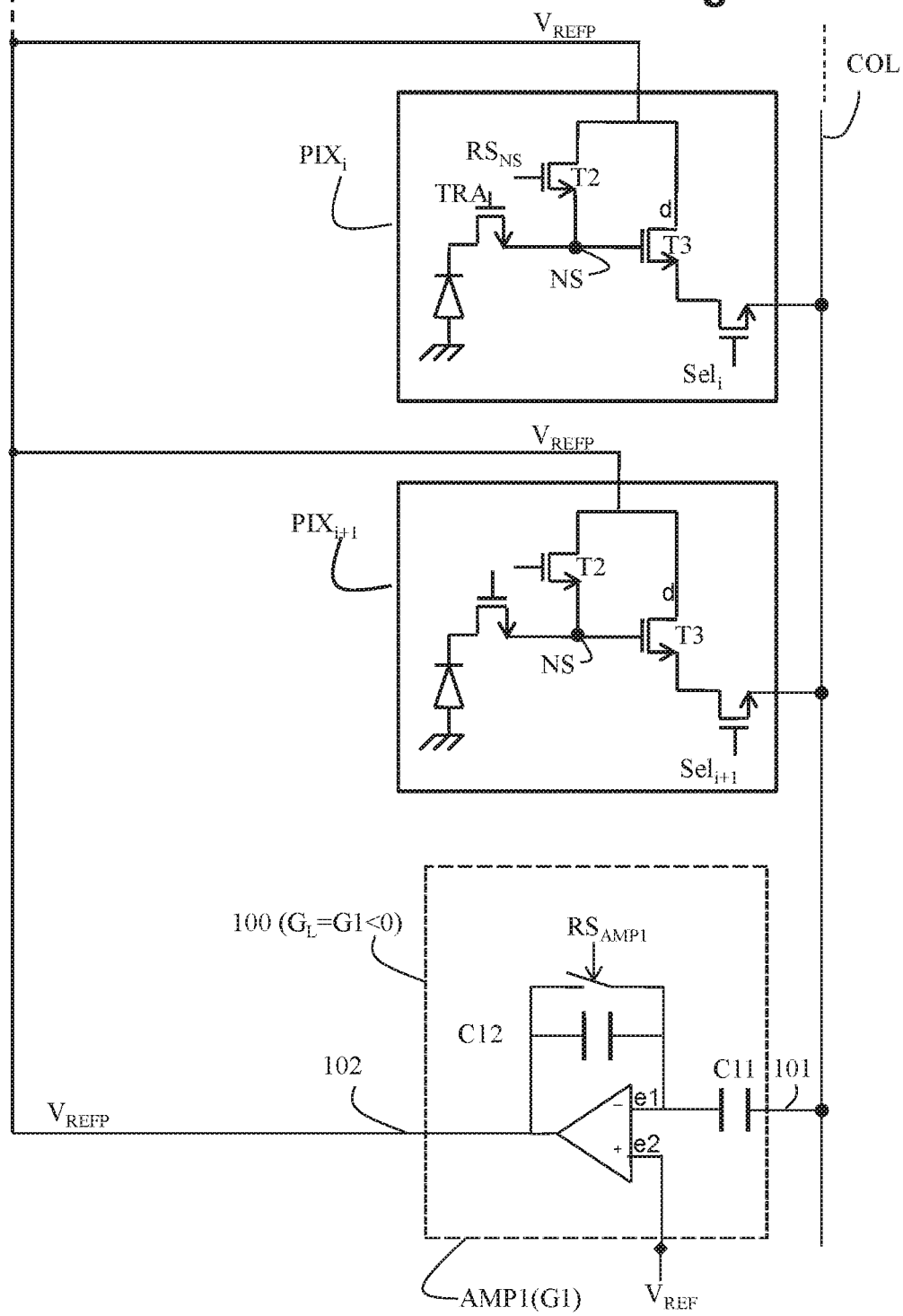
FIG. 3 illustrates a first embodiment of a feedback loop having an amplifier with a negative gain, according to the invention.

A first exemplary embodiment of a feedback loop with a predetermined negative loop gain $G_L$ is illustrated in FIG. 3. Two consecutive pixels $PIX_i$ and $PIX_{i+1}$ of the same column COL of pixels are represented therein. These two pixels are connected to the column conductor COL by their respective selection transistor controlled, for the pixel $PIX_i$ by a signal $SEL_i$ for selection of a row, of rank i of the matrix, and for the pixel $PIX_{i+1}$ by a signal $SEL_{i+1}$ for selection of the next row, of rank i+1. The selection signals are sequenced so that a single pixel of the column at a time is selected for reading. When a pixel of the column is selected for reading, the transistor T3 of the pixel has its source connected to the current source CC and operates as a follower.

The feedback loop 100 with a gain $G_L$ is formed by an amplifier AMP1 with a negative gain G1. Here, $G_L$=G1. The amplifier has an input e1 connected to the column conductor COL. The other input e2 receives a reference voltage $V_{REF}$. This reference voltage $V_{REF}$ is common to all the pixels of the matrix. The output of the amplifier forms the output 102 of the loop. It is connected to the drain supply conductor of the follower transistors T3 of all the pixels of the column.

Preferably, the input e1 is connected to the column conductor COL by an input capacitor C11, and a feedback capacitor C12 is connected between this input and the output of the amplifier. A switch controlled by an initialisation signal $RS_{AMP1}$ is placed in parallel with this capacitor C12. The switch, controlled by the signal $RS_{AMP1}$, and the two capacitors make it possible to carry out initialisation of the amplifier according to a follower mode arrangement, making it possible to copy at the output the input reference voltage (the output S1 of the amplifier changes until the difference in voltage between the two inputs e1 and e2 is cancelled). The reference voltage level $V_{REF}$ is thus imposed on the output S1 of the amplifier. In practice, this initialisation of the loop amplifier is carried out in the phase of reinitialising the storage node: the voltage $V_{REF}$ is used for reinitialising the storage node NS, and a corresponding voltage level Vcol is again found on the column conductor COL. In this phase, the feedback loop is disabled, without a gain effect. The variations in the voltage level of the column have no effect on the voltage level applied to the drain of the follower transistor; the latter is constant and equal to Vref. After reinitialisation of the storage node NS and of the amplifier AMP1, the signal $RS_{AMP1}$ is relaxed, enabling the feedback loop: any difference in voltage between the column voltage Vcol and the reference voltage $V_{REF}$ is then amplified by the amplifier AMP1 the negative gain of which is G1=−C11/C12.

Figure 4:
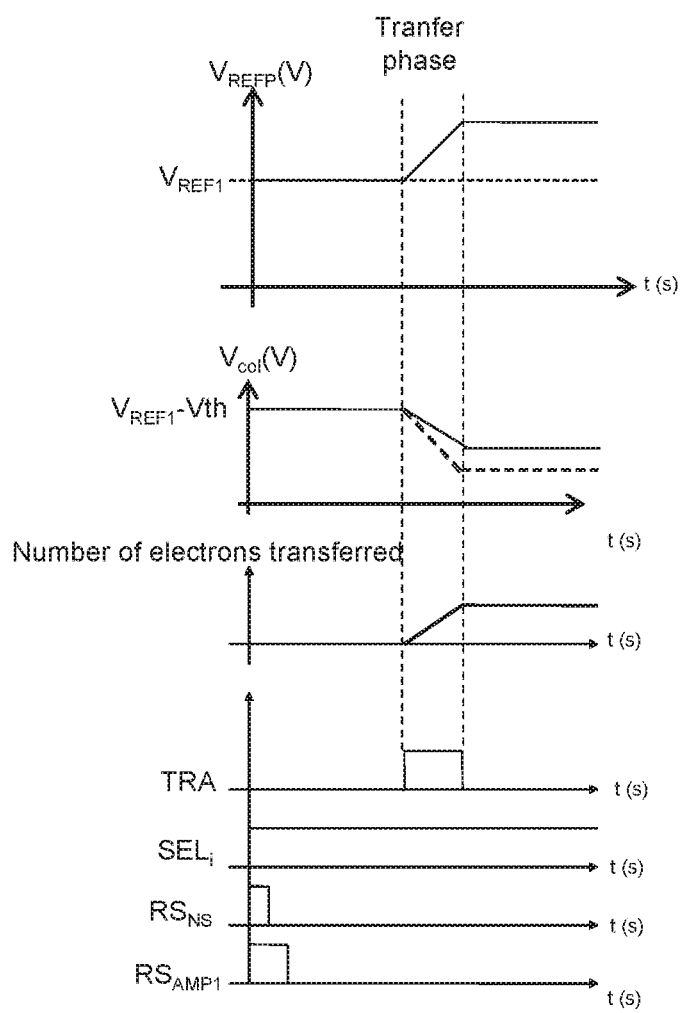
FIG. 4 illustrates a time diagram showing the effect of the feedback loop during the charge transfer phase.

This feedback effect is illustrated in FIG. 4, which shows the variation in the voltage $V_{REFP}$ applied to the drain of the pixel by the feedback loop. This takes place during and after the phase of transferring the charges (electrons) to the storage node (TRA). In this phase (TRA), the charges of the photodiode which are transferred to the storage node NS make the voltage at this node change (decrease), and therefore also the voltage Vcol on the column, according to the charge/voltage conversion factor.

Since the loop gain $G_L$ is negative in this example, it makes the charge/voltage conversion factor at the storage node of the pixel decrease: the voltage level at the storage node, and therefore the level of the voltage Vcol on the column, decrease less rapidly and, at the end of the transfer, reach a level which is higher than that which would have been obtained for the same quantity of charge transferred, without the feedback loop. The variation in the voltage Vcol with and without the loop is respectively represented by the solid curve and the dashed curve in FIG. 4. This configuration is favourable at high illumination levels, making it possible to avoid saturation of the reading electronics system. A specific action may be carried out in order to disable the feedback loop during the phase of reading the charges of the storage node, if the overall illumination of the sensor is lower, for example by short-circuiting the capacitor C12 even outside the reinitialisation phases. This action may be decided by the user, or as a function of automatic detection of the overall illumination of the sensor. An action decided by the user, or by automatic detection, may alternatively be provided in order to modify the gain of the amplifier; this may, for example, be done by selecting another capacitor C11 or C12 of different value, as a function of the illumination.

On the same principle, a feedback loop with a predetermined positive loop gain $G_L$ is produced by using two amplifiers, each having a structure comparable with the structure of the amplifier of FIG. 3, which are connected one after the other in series. The positive loop gain $G_L$ makes the charge/voltage conversion factor at the storage node of the pixel increase: for a given quantity of charge transferred, the voltage level at the storage node decreases more rapidly and, at the end of the transfer, reaches a value which is lower than that which would have been obtained for the same quantity of charge transferred, without the feedback loop. This configuration is favourable at low illumination levels. A specific action may be carried out in order to disable the feedback loop during the phase of reading the charges of the storage node, if the overall illumination of the sensor is higher, for example by short-circuiting the capacitor C12 even outside the reinitialisation phases. This action may be decided by the user, or as a function of automatic detection of the overall illumination of the sensor. An action decided by the user, or by automatic detection, may alternatively be provided in order to modify the gain of one of the amplifiers; this may, for example, be done by selecting other values of capacitors associated with each of the amplifiers, as a function of the illumination.

This disabling or enabling, or this gain modification, is for example obtained by an external configuration means of the sensor (programming, control button, etc.), or alternatively on the basis of a measurement of the average luminosity of the scene obtained in the sensor.

Provision may also be made that the feedback loop can be enabled with a positive loop gain or a negative loop gain G, as a function of the illumination. This selection of positive or negative gain may be obtained by an external configuration means of the sensor (programming, control button, selector, etc.), or on the basis of a measurement of the average luminosity of the scene, carried out by the sensor.

Such a sensor then makes it possible for a user to enable the feedback loop with a gain that is most suitable for the illumination of the scene which is intended to be picked up: negative if the illumination is high, positive if it is conversely low.

Figure 5:
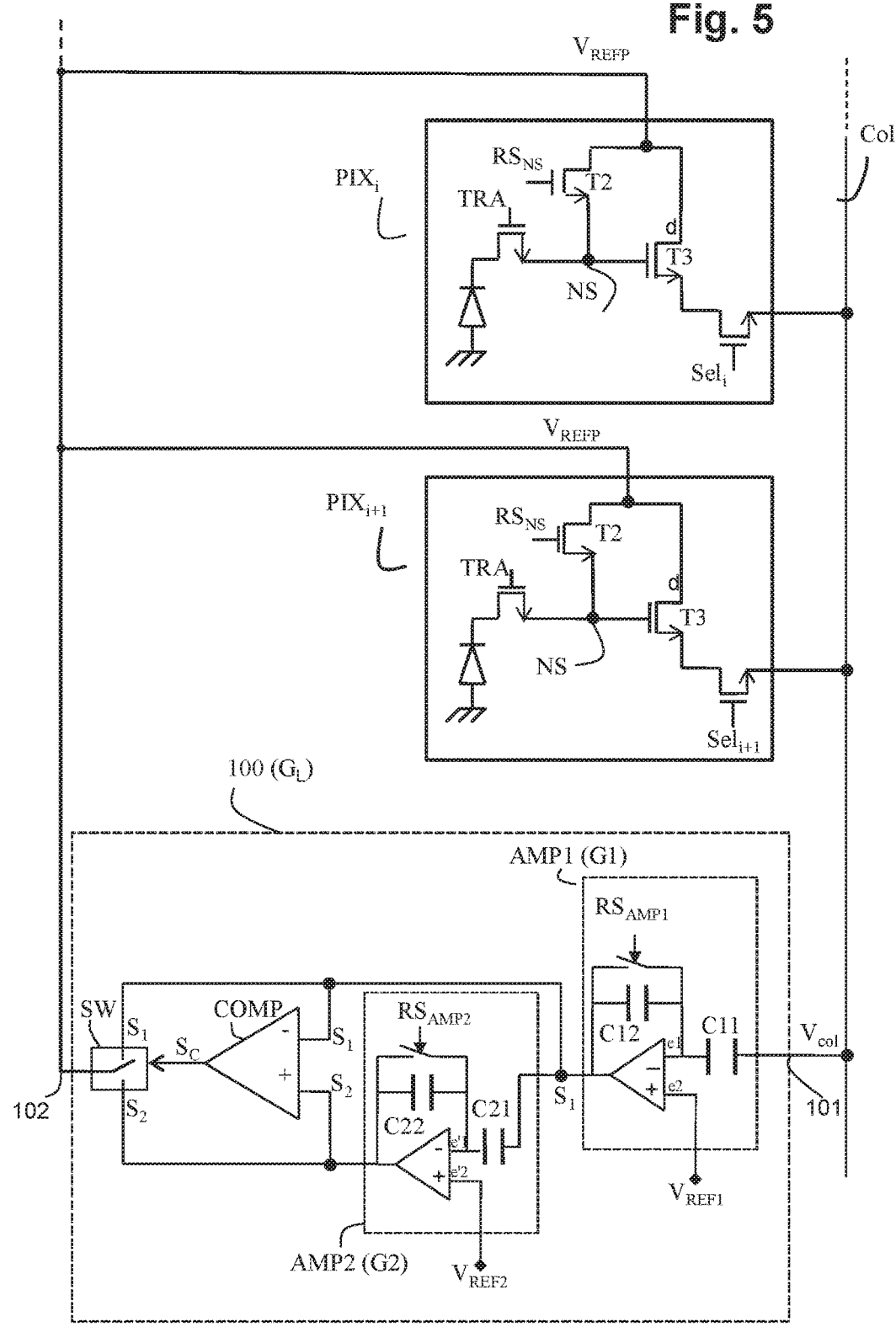
FIG. 5 illustrates a second embodiment of a feedback loop according to the invention having two amplifiers, each with a negative gain, and a comparator, making it possible to fix the loop gain at a positive value or negative value as a function of the voltage provided by the column conductor during the reading of the charges stored in the storage node.

FIG. 5 illustrates an improved embodiment of a feedback loop according to the invention, by which the loop gain $G_L$ is established at a value which is a function of the voltage level provided by the column conductor during the phase of transferring the charges stored in the storage node. In other words, the loop gain $G_L$ is slaved to the illumination received by the pixel. The usable dynamic range of the pixel towards the two ends is then improved.

In the embodiment of FIG. 5, provision is made for the modification of the behaviour of the feedback loop to consist in selecting between a positive loop gain and a negative loop gain, although the slaving as a function of the column voltage could also consist in selecting between two positive gains or two negative gains with different values, or alternatively selecting between enabling or disabling of the loop.

In FIG. 5, the feedback loop 100 comprises two amplifiers with a negative gain in series, having the same structure:
  a first amplifier AMP1 with a negative gain G1, with, on an input e1, an input capacitor C11, a feedback capacitor C12 and a switch, which is controlled by an initialisation signal $RS_{AMP1}$ and receives a first reference voltage $V_{REF1}$ on an input e2; the negative gain is G1=−C11/C12.
  a second amplifier AMP2 with a negative gain G2, with, on an input e'1, an input capacitor C21, a feedback capacitor C22 and a switch, which is controlled by an initialisation signal $RS_{AMP2}$, and receives a second reference voltage $V_{REF2}$ on an input e'2; its gain is G2=−C21/C22.

The column conductor COL is connected to the input e1 of the first amplifier by its input capacitor C11; the output S1 of the first amplifier is connected to the input of the second amplifier by its input capacitor C21. The outputs S1 and S2 of the amplifiers are applied to the inputs of a comparator COMP, the output of which controls a circuit SW for routing one or other output S1 or S2 onto the output 102 of the feedback loop. Depending on the routing controlled for the pixel selected for reading, the output voltage S1 or S2 is therefore obtained as the drain voltage $V_{REFP}$ of the follower transistor T3 of the pixel. In reality, this voltage is applied to the drain of the follower transistors of all the pixels of the column, the pixel selected for reading and the pixels not selected for reading.

There is therefore a different loop gain according to whether the comparator flips in one direction or the other: negative gain G1 or positive gain G1×G2. This flipping depends on the voltage level on the column conductor, since the state of the comparator depends on this level; the comparator routes the signal S1 to the drain of the follower transistors for high illuminations and the loop gain G1 is negative; the charge/voltage conversion factor is then low. Conversely, it routes the signal S2 the drains of the follower transistors for low illuminations and the loop gain is G1G2; the charge/voltage conversion factor is then high. There is no loop gain during the phase of reinitialising the pixel, a voltage Vref2 being imposed on the drain of the follower transistor The reference voltage $V_{REF2}$ of the amplifier AMP2 is selected to be higher than the voltage $V_{REF1}$ of the amplifier AMP1. In one example, $V_{REF2}$ is established at 3.3 volts and the voltage $V_{REF1}$ at 3 volts. The comparator COMP is configured in order to impose the voltage $V_{REF2}$ at the output 102 of the feedback loop, via the routing means SW, during the phase of initialising the storage node.

The outputs S1 and S2 then vary inversely to one another, as a function of the column voltage Vcol received at the input, this voltage decreasing during the transfer of charges from the photodiode to the storage node:

S2 starts from $V_{REF2}$ and then decreases with a slope which is a function of the product of the gains G1 and G2;

S1 starts from $V_{REF1} < V_{REF2}$ and increases with a slope is a function of the gain G1.

The output S2 is imposed during the initialisation phase, and continues to be applied for low illumination levels. The output S1 is imposed if the voltage Vcol reaches a threshold voltage such that the outputs S1 and S2 cross over, for a value $V_B$. This flipping value $V_B$ of the comparator is fixed by the reference voltages and the respective gains of the amplifiers AMP1 and AMP2. It is in practice equal to $(V_{REF2}-V_{REF1})/(G1+G1\times G2)$.

These reference voltages and the gains G1, G2 are also selected so that the loop output 102 provides a drain voltage $V_{REFP}$ ensuring that the follower transistor T3 is always biased to saturation (follower mode).

In practice, G1 and G2 are selected such that the product $G_f \times G1$ is close to −1, and that $G_f \times G1_x G2$ is greater than 1, and preferably less than 3. It is ideally of the order of 2 to 2.5. The follower transistor gain $G_f$ is generally of the order of 0.8 or 0.9 with the conventionally used MOS transistor technologies.

Figure 6:
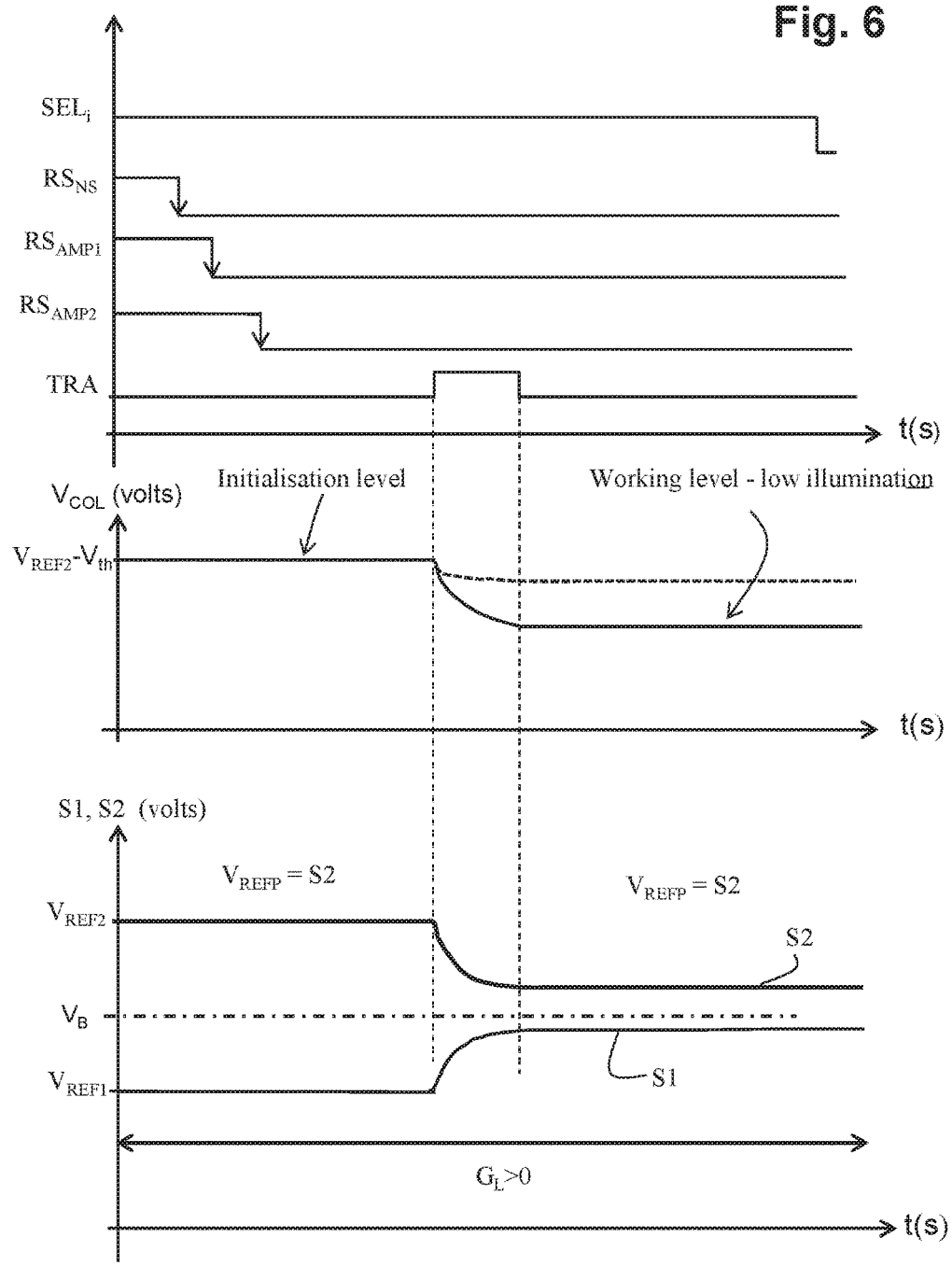

The way in which the pixel is read with such a loop, with a loop gain modified as a function of the illumination, will now be explained with reference to the time diagrams of FIGS. 6 and 7. FIG. 6 illustrates the case of reading a pixel which has collected a small number of charges, corresponding to a low illumination level, and FIG. 7 illustrates the reading of a pixel which has collected a large number of charges, corresponding to a high illumination level.

As can be seen in these time diagrams, it is during and after the transfer of the charges into the collective storage node that the feedback loop acts.

Before this, there is first a phase of reinitialising the storage node NS of the pixel, carried out by the signal $RS_{NS}$. During this phase, the two amplifiers AMP1 and AMP2 are each initialised as described above with reference to FIG. 3, so that the reference voltage $V_{REF1}$ is found at the output S1 and the reference voltage $V_{REF2}$ is found at the output S2. In practice, and as illustrated, the respective duration of the initialisation signals $RS_{NS}$, $RS_{AMP1}$, $RS_{AMP2}$ is defined in order to obtain stabilisation of the voltage at the storage node, then that of the output S1, then that of the output S2. As explained above, during this phase it is the output S2 which is switched to the loop output 102: the level of reinitialisation of the storage node is therefore established at the voltage $V_{REF2}$. The voltage Vcol, which is a copy thereof on the column conductor, is established substantially at this same level (to within the threshold voltage $V_{th}$ of the follower transistor).

It will be noted that a reinitialisation voltage Vref2 could be applied to the storage node during the reinitialisation phase without passing through the amplifiers. It will also be noted that the reinitialisation transistor T2 could be connected as a diode without control of its gate by a reinitialisation signal, the reinitialisation taking place because of the application of the voltage Vref2 to the drain of this transistor connected as a diode.

Next, during the phase of transferring the charges into the storage node, carried out by the signal TRA, the (negative) charges make the voltage on the storage node, and therefore the voltage Vcol, decrease. As the loop gain is positive, the output voltage S2, and therefore the drain voltage $V_{REFP}$, decreases more rapidly than the voltage on the storage node NS, and therefore than the voltage Vcol on the column conductor; the conversion factor is increased.

For low illumination levels, a small quantity of electrons is transferred: even with an increased conversion factor, the voltage Vcol does not reach the flipping threshold $V_B$ of the comparator COMP: the voltage S2 is imposed as the drain voltage $V_{REFP}$ throughout the transfer phase. At the end of this transfer phase, the voltage Vcol stabilises at a level significantly lower than that at which it would be stabilised for the same quantity of charge transferred, without the feedback loop. It is this which is represented in FIG. 6: on the time diagram representing the variation in the voltage Vcol during the reading of the pixel, the dashed curve represents what the voltage level Vcol would have been without the feedback loop according to the invention, whereas the solid curve shows the variation in the voltage level Vcol with the loop.

The outputs S1 and S2 do not cross over, because the quantity of charge transferred is small: neither reaches the tripping threshold $V_B$ of the comparator: throughout the sequence of reading the pixel, the voltage $V_{REFP}$ remains fixed by the output S2 of the comparator, and varies as it does.

FIG. 7 illustrates what conversely happens when the quantity of charge collected is high: as explained with reference to FIGS. 3 and 4, the column voltage will decrease less rapidly than if there were no feedback, but since the quantity of charge transferred is high, the outputs S1 and S2 will in this case cross over and make the comparator flip: the voltage $V_{REFP}$ which was initially fixed by the output S2, at the start of the transfer phase, then follows the output S1, and increases. The conversion factor is reduced, preventing the voltage Vcol from reaching a voltage level which is too high.

It has been seen that, in practice, the reading of the pixel generally comprises two analog/digital conversions followed by subtraction of the two digital values obtained. The first conversion being that of the initialisation level, before the charge transfer phase: there is no loop gain: the voltage Vcol corresponds to the reference voltage $V_{REF2}$. The second conversion being that of the working level, after charge transfer, the loop gain varies as a function of the illumination: the voltage Vcol obtained will depend on the actual conversion factor at the storage node, at the end of the transfer phase, and therefore as a function of G1 and G2, or alternatively G1 alone.

Means for making the two conversions homogeneous are therefore provided in the reading circuit. Notably, provision will be made to transmit a signal coming from the comparator to the reading circuit.

In the description above, it was assumed that the sensor operates with automatic flipping between two values of the charge/voltage conversion factor, one for the highest illuminations and the other for the lowest illuminations, this flipping resulting from the use of two different loop gains. Automation of the flipping between three or more conversion factor values, resulting from the use of three or more different gains, could alternatively be provided.

The invention claimed is:

1. An image sensor with active pixels, comprising pixels and reading circuits, each pixel having
 at least one photosensitive element,
 a storage node for storage of charges generated by the photosensitive element of the pixel, and
 a follower transistor having
  a gate connected to the storage node,
  a source connected to a column conductor, the column conductor being connected to a reading circuit, and
  a drain configured to receive a supply voltage,
 wherein
 a feedback loop is provided, said feedback loop having an input connected to the column conductor and an output connected to the drain of the follower transistor in order to provide the supply voltage to the drain, and
 a behaviour of the feedback loop being modified as a function of an illumination received by the image sensor.

2. The sensor of claim 1, wherein said behaviour is modified by enabling or disabling the feedback loop as a function of the illumination received by the image sensor.

3. The sensor of claim 1, wherein said behaviour is modified by modifying a gain of the feedback loop as a function of the illumination received by the image sensor.

4. The sensor of claim 3, wherein said gain is modified between a positive value and a negative value.

5. The sensor of claim 1, wherein said received illumination, which is used to modify the behaviour of the feedback loop, is an overall illumination received by the sensor.

6. The sensor of claim 1, wherein the received illumination, which is used to modify the behaviour of the feedback loop, is an illumination received by a pixel being read.

7. The sensor of claim 6, wherein
when the charges of the storage node of a pixel are read, the follower transistor of the pixel applies a corresponding voltage to the column conductor of the pixel, which represents an illumination received by the pixel, and the behaviour of the feedback loop is modified as a function of said voltage present on the column conductor.

8. The sensor of claim 1, each pixel further comprising a transfer transistor for transferring charges collected by the photosensitive element of the pixel to the storage node during a charge transfer phase after a phase of initialising the storage node,
wherein the feedback loop is disabled during the phase of initialising the storage node.

9. The sensor of claim 1, wherein the feedback loop comprises:
 a first amplifier with a negative gain,
 a second amplifier with a negative gain, and
 a comparator,
 wherein
 a first input of the first amplifier is connected to the column conductor,
 an output of the first amplifier is connected at a first input of the second amplifier, and
 the comparator is configured to
  receive the output of the first amplifier and an output of the second amplifier, and
  provide a control signal for routing either the output of the first amplifier or the output of the second amplifier to the drain of the follower transistor.

10. The sensor of claim 9, wherein:
the first amplifier has
 an input capacitor,
 the first input connected to the column conductor by the input capacitor of the first amplifier, and
 a second input connected to a first reference voltage,
 a feedback capacitor, and
 a switch for short-circuiting the feedback capacitor of the first amplifier during a phase of initialising the storage node; and
the second amplifier has
 an input capacitor,
 the first input connected to the column conductor by the input capacitor of the second amplifier,
 a second input connected to a second reference voltage,
 a feedback capacitor, and
 a switch for short-circuiting the feedback capacitor of the second amplifier during a phase of initialising the storage node.

* * * * *